United States Patent [19]

Johnson

[11] Patent Number: 5,398,892
[45] Date of Patent: Mar. 21, 1995

[54] SPACECRAFT BERTHING MECHANISM

[75] Inventor: Caldwell C. Johnson, Dickinson, Tex.

[73] Assignee: Space Industries, Inc., League City, Tex.

[21] Appl. No.: 253,329

[22] Filed: Jun. 3, 1994

Related U.S. Application Data

[63] Continuation of Ser. No. 949,110, Sep. 23, 1992, abandoned.

[51] Int. Cl.⁶ .......................... B64G 1/64; B64G 1/22
[52] U.S. Cl. ................................ 244/161; 244/158 R
[58] Field of Search ...................... 244/158, 159, 161

[56] References Cited

U.S. PATENT DOCUMENTS

| | | | |
|---|---|---|---|
| 3,201,065 | 8/1965 | Dunn | 244/161 |
| 3,254,863 | 6/1966 | Tyler | 244/161 |
| 3,608,848 | 9/1971 | Cantor | 244/161 |
| 3,820,741 | 6/1974 | Ratcliff | 244/1 SD |
| 3,910,533 | 10/1975 | Cheatham et al. | 244/161 |
| 4,728,061 | 3/1988 | Johnson et al. | |
| 4,809,936 | 3/1989 | Whitaker | 244/161 |
| 4,834,325 | 5/1989 | Faget et al. | |
| 4,858,857 | 8/1989 | Lange et al. | 405/188 |
| 4,903,919 | 2/1990 | Johnson et al. | 244/161 |
| 5,040,749 | 8/1991 | Johnson | 244/161 |
| 5,104,070 | 4/1992 | Johnson et al. | 244/161 |

*Primary Examiner*—Michael S. Huppert
*Assistant Examiner*—Virna Lissi Mojica
*Attorney, Agent, or Firm*—Roylance, Abrams, Berdo & Goodman

[57] ABSTRACT

A spacecraft berthing mechanism for coupling spacecraft is provided which has minimal effect on the maximum size an associated spacecraft hull may have. The berthing mechanism includes a flange member which defines a hatchway and which is adapted for attachment to a spacecraft port. The flange member has a forwardly facing interface surface through which the hatchway passes and an outer peripheral surface extending rearwardly from the interface surface. The peripheral surface has a plurality of beveled portions spaced substantially evenly about the peripheral surface. A plurality of alignment guides are arranged on the flange member such that several of the alignment guides are positioned adjacent one of the beveled portions and the remaining alignment guides are positioned adjacent an opposing beveled portion.

14 Claims, 4 Drawing Sheets

SPACECRAFT BERTHING MECHANISM

This is a continuation of application Ser. No. 07/949,110, filed Sep. 23, 1992, now abandoned.

BACKGROUND OF THE INVENTION

The present invention relates generally to apparatus for coupling spacecraft, and more particularly to a spacecraft berthing mechanism having a construction that minimizes the overall radial projection of the berthing mechanism from an associated spacecraft hull.

Various types of apparatus have been proposed for accomplishing a temporary or permanent mechanical connection between two spacecraft so that different operations may be performed. Such operations include the passage of crew members between the spacecraft for crew-tended operations and logistical support and the passage of modules containing expendable supplies and equipment needed for space-borne experiments and manufacturing processes. The operations may also include the assembly and structural expansion of spacecraft and the on-orbit repair and maintenance of spacecraft.

An example of a docking apparatus is disclosed in commonly assigned U.S. Pat. No. 4,903,919 issued to Caldwell C. Johnson and Maxime A. Faget on Feb. 27, 1990 and entitled "Apparatus and Method for Docking Spacecraft". The aforementioned docking apparatus is particularly useful for coupling an Industrial Space Facility (ISF) spacecraft module (designed by Space Industries, Inc. of League City, Tex., the assignee of the present invention) to the Space Transportation System (also referred to as the Space Shuttle Orbiter and developed in the United States by the National Aeronautics and Space Administration (NASA)). The ISF spacecraft module is described in more detail in commonly assigned U.S. Pat. No. 4,728,061, issued to Caldwell C. Johnson et al. on Mar. 1, 1988, entitled "Spacecraft Operable In Two Alternative Flight Modes", and in commonly assigned U.S. Pat. No. 4,834,325 issued to Maxime Faget et al on May 30, 1989 entitled "Modular Spacecraft System". The module is generally cylindrical in shape, with a plurality of the modules being capable of being joined together in a side-by-side relationship. The individual spacecraft modules may be carried into orbit by the NASA Space Shuttle and joined together to form an orbiting laboratory in which research and development may be carried out.

The ISF docking apparatus described in U.S. Pat. No. 4,903,919 is preferably mounted to the NASA Space Shuttle and includes a berthing mechanism attached to one end thereof. A complementary berthing mechanism is permanently attached to the ISF spacecraft module so that when the two berthing mechanisms are brought together, a pressure-tight joint is formed therebetween.

An example of a berthing mechanism that may be used in connection with the ISF docking apparatus is disclosed in more detail in commonly assigned U.S. Pat. No. 5,040,749, issued to Caldwell C Johnson on Aug. 20, 1991 and entitled "Spacecraft Berthing Mechanism With Discrete Impact Attenuation Means". Such a berthing mechanism may also be employed for coupling individual ISF spacecraft modules together. Generally, the berthing mechanism comprises a cylindrical peripheral flange that defines a passage-way and that is adapted for attachment to a port or other aperture of a spacecraft. The flange includes a forward interface surface and a rearward rim for attaching the flange to the port. Alignment rails are selectively positioned about the outer edge of the flange in order to provide guidance during coupling of two berthing mechanisms.

When a berthing mechanism is mounted to the port of a spacecraft, it typically protrudes radially outward from the spacecraft pressure hull. If the spacecraft is to be transported into orbit in the payload bay of another spacecraft, e.g., the NASA Space Shuttle, this protrusion may significantly affect the maximum allowable size the spacecraft pressure hull may have while still being capable of fitting within the payload bay. The degree to which the berthing mechanism affects the size of the spacecraft pressure hull largely depends on the size of the corresponding hatchway.

Presently, NASA is contemplating a uniform hatch size for the modules of the NASA Space Station. NASA has decided that the hatches for the NASA Space Station modules should be large enough to allow passage of a standard double rack. A standard double rack is approximately $36 \times 41.5 \times 80$ inches. The space module hatches would therefore need to be relatively large in size to allow safe passage of a double rack.

In order to provide uniformity within the spacecraft industry, it is desirable that the hatches for the ISF space modules also be large enough to allow passage of a double rack. A berthing mechanism of conventional geometry, however, that is sized to allow access of a double rack, would be relatively large and, therefore, would have a significant effect on the allowable size of the ISF spacecraft module to which it is attached.

SUMMARY OF THE INVENTION

The present invention provides a spacecraft berthing mechanism for coupling spacecraft, which has a minimal effect on the size of the associated spacecraft. The berthing mechanism preferably comprises a flange member that defines a hatchway and is adapted for attachment to a spacecraft port. The flange member has a forwardly facing interface surface through which the hatchway passes and an outer peripheral surface extending rearwardly from the interface surface. At least one alignment guide projects from the flange member in a region of the flange member where the interface surface intersects the peripheral surface. In addition, the peripheral surface has at least one beveled portion positioned adjacent the guide. The beveled portion is preferably at an angle with respect to the interface surface. In a preferred embodiment of the invention, the peripheral surface has four beveled portions spaced substantially evenly about the peripheral surface. Furthermore, the berthing mechanism has at least two alignment guides arranged on the flange member such that one of the alignment guides is positioned adjacent one of the beveled portions and the other alignment guide is positioned adjacent a substantially opposing beveled portion.

BRIEF DESCRIPTION OF THE DRAWINGS

The various objects, advantages, and novel features of the present invention will be more clearly understood from the following detailed description when read in conjunction with the appended drawings, in which.

DETAILED DESCRIPTION OF THE PREFERRED EMBODIMENT

Figure 1:
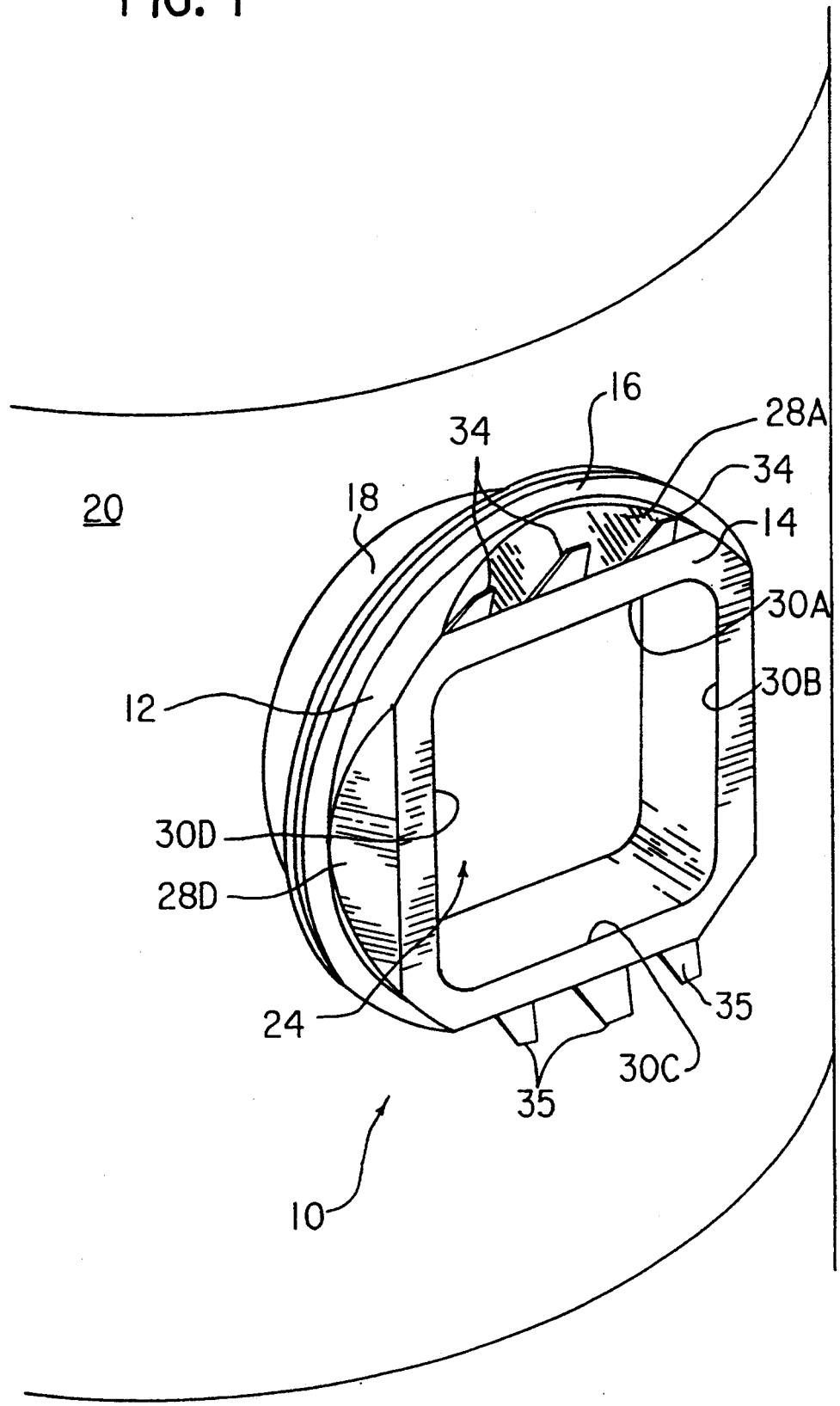
FIG. 1 is a perspective view of a berthing mechanism in accordance with the present invention, mounted to a spacecraft pressure hull.

FIGS. 1 through 5 illustrate a preferred construction of a berthing mechanism 10 in accordance with the present invention. The berthing mechanism 10 has a configuration that minimizes the amount that the berthing mechanism radially protrudes from a spacecraft to which it is attached. The berthing mechanism 10 comprises a flange member 12 with a forward interface surface 14 and a rearward rim 16 for attaching the berthing mechanism 10 in a conventional manner to a port 18 of a spacecraft pressure hull 20. The interface surface 14 preferably defines a substantially rectangular opening 24 configured to allow passage of a double rack. Although the opening 24 is shown having a substantially rectangular shape, the opening is not limited to such a shape and may have other configurations. The flange member 12 has a generally cylindrical outer surface with a plurality of beveled sides 28A–28D disposed about the periphery. Preferably, the beveled sides 28A–28D are arranged correspondingly with respective sides 30A–30D of the rectangular opening 24 so that there are a total of four beveled sides 28A–28D.

A plurality of alignment guides 34, 35 project outwardly from the interface surface 14. The alignment guides 34, 35 provide necessary lateral and indexing alignment during coupling of the berthing mechanism 10 to a complementary berthing mechanism. In order to provide adequate alignment assistance, the alignment guides 34, 35 are preferably positioned at, near, or adjacent to the intersection of the interface surface 14 and at least two opposing beveled sides 28A, 28C, respectively. Furthermore, the alignment guides of one side are preferably offset with respect to the guides of the opposing side. By offsetting the alignment guides in such a manner identical berthing mechanisms that are rotated 180° may be joined together.

Figure 5:
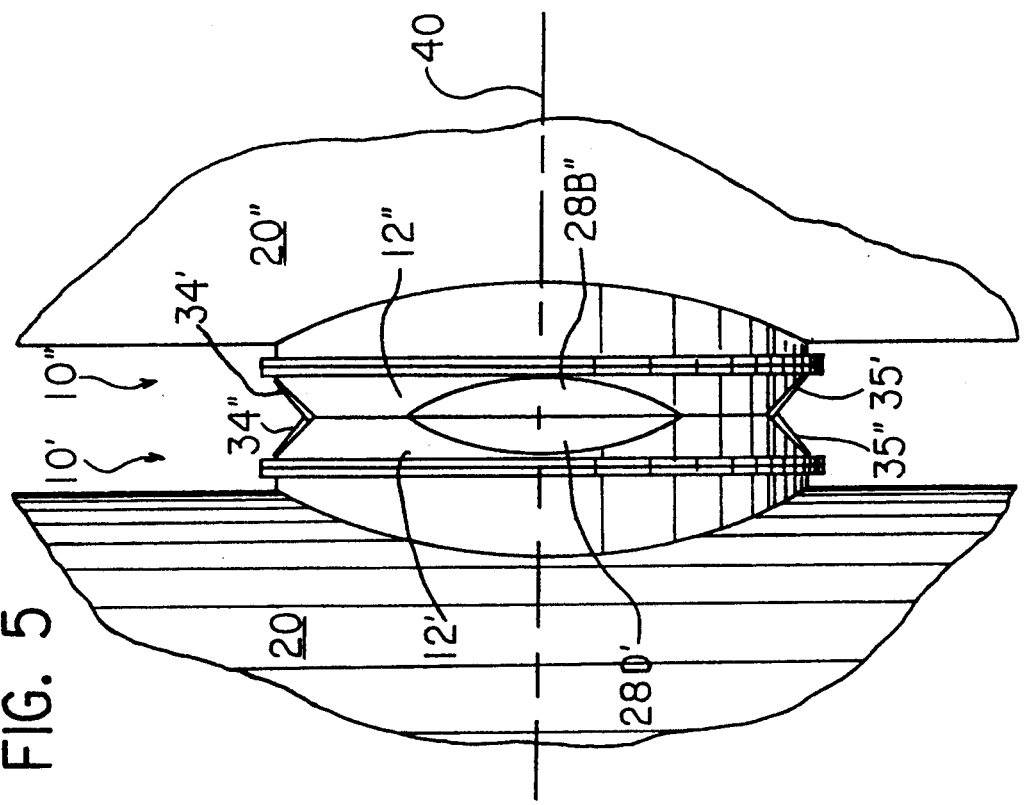
FIG. 5 illustrates the coupling of two berthing mechanisms in accordance with the present invention.
Figure 4:
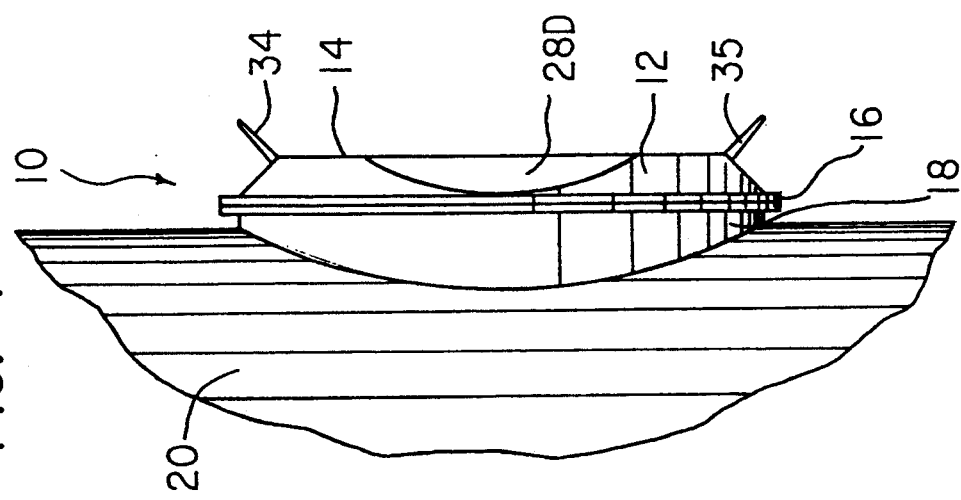
FIG. 4 is a partial side view of the berthing mechanism of FIG. 1.

FIG. 5 illustrates the coupling of two berthing mechanisms 10' and 10" configured in accordance with the present invention. Coupling of the berthing mechanisms 10' and 10" may be accomplished in accordance with the procedure described in commonly assigned U.S. Pat. No. 5,040,749, issued to Caldwell C. Johnson on Aug. 20, 1991 and entitled "Spacecraft Berthing Mechanism With Discrete Impact Attenuation Means", which is expressly incorporated by reference herein. As the berthing mechanisms 10', 10" are brought together, the alignment guides 34', 35' of one berthing mechanism 10' glide along and interdigitate with the alignment guides 34", 35" of the opposing berthing mechanism 10'. The respective beveled sides adjacent the alignment guides 34', 35', 34", 35" also provide guiding surfaces on which opposing alignment guides may glide during coupling. When the berthing mechanisms 10', 10" are properly joined together, the respective interface surfaces 14', 14" are in pressure-tight, opposing relation, with the alignment guides 34', 35', 34", 35" positioned alongside the beveled sides of the opposing berthing mechanism. Such an arrangement secures all degrees of freedom of movement of the associated spacecraft pressure hull 20', 20", except along an axis of separation 40 of the interface surfaces. Conventional latches (not shown), may be provided on the berthing mechanisms in order to hold the interface surfaces in pressure tight relation along the separation axis 40.

Figure 3:
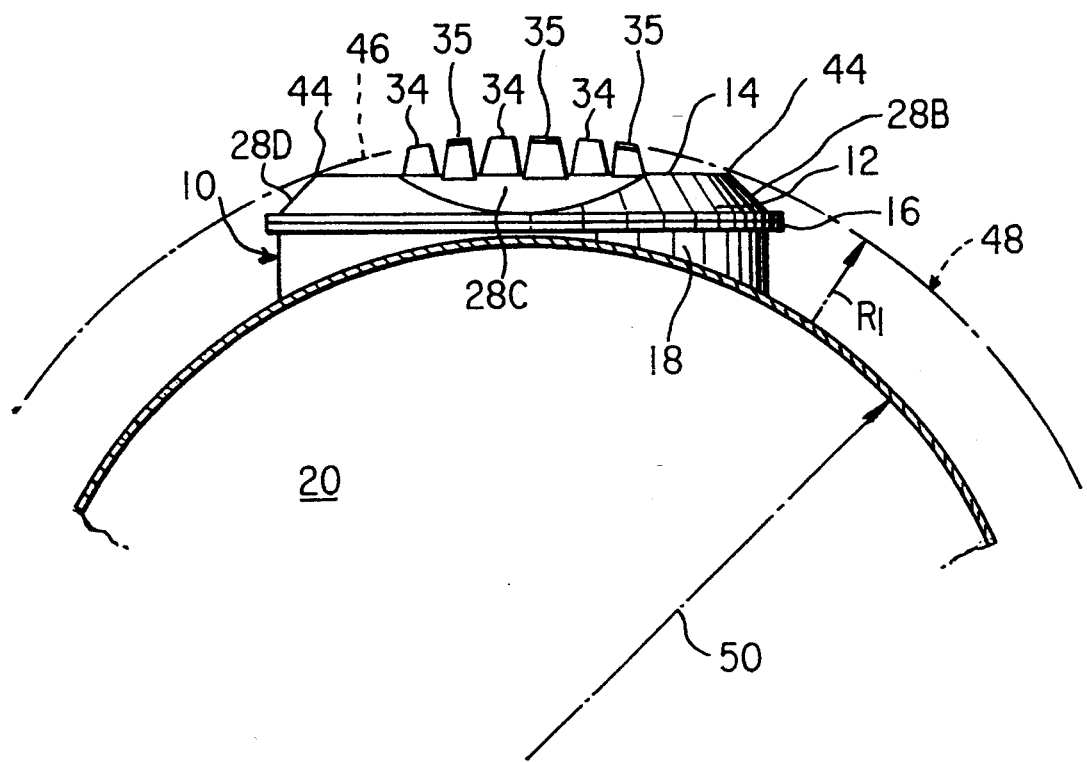
FIG. 3 is a top view of the berthing mechanism of FIG. 1 with the spacecraft pressure hull shown in cross section.

With reference to FIG. 3, the alignment guides 34, 35 preferably project from the interface surface 14 at such an angle and distance that the guides lie within a circular arc 46 defined by the outer radial limits 44 of the flange 12 and the inside circumference 48 of the payload bay of a transport vehicle (not shown) in which the spacecraft pressure hull 20 and berthing mechanism 10 are to be carried. If the spacecraft pressure hull 20 is to be transported into space by a transport vehicle, the maximum size of the spacecraft pressure hull 20 and its associated berthing mechanism 10 is constrained by the inside circumference 48 of the transport vehicle's payload bay. Accordingly, the maximum allowable radius 50 of the spacecraft pressure hull 20 is dependent on the amount of radial projection $R_1$ of the berthing mechanism 10. Positioning the alignment guides 34, 35 within the circular arc defined by the flange 12 and the payload bay inside circumference 48 nullifies the effect the guides have on the extent of the radial projection $R_1$ of the overall berthing mechanism 10 from the spacecraft pressure hull 20. In addition, by providing the beveled sides 28B, 28D, the radial projection of the outer limits 44 of the flange 12 is minimized, thus contributing to the mimimization of the overall radial projection of the berthing mechanism 10. As a consequence, the spacecraft pressure hull 20 can have a larger diameter.

Figure 2:
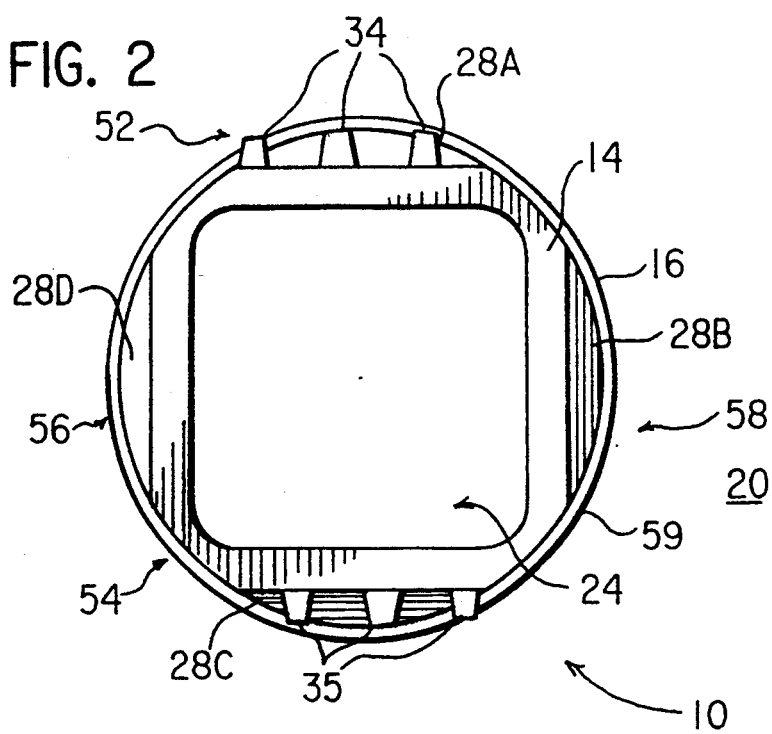
FIG. 2 is a front view of the berthing mechanism of FIG. 1.

As shown in FIGS. 1-5, maximum benefit can be achieved if the guides 34, 35 are positioned on the top 52 and bottom 54 of the berthing mechanism rather than on the sides 56 and 58 of the berthing mechanism. Accordingly, when the spacecraft pressure hull 20 is positioned within a payload bay as represented in FIG. 3, the guides will lie within the arc 46. In addition to being constrained by the arc 46, the length and angle of protrusion of the guides 34, 35 are also preferably constrained by the circumference 59 of the port as shown in FIG. 2. In a preferred embodiment of the invention, the guides 34, 35 extend from the housing at an angle of approximately 45 degrees with respect to the interface surface 14. Preferably, the beveled sides 28A through 28D likewise form an angle of approximately 45 degrees with the interface surface 14 so that like berthing mechanisms can more easily be coupled together as shown in FIG. 5.

Figure 6:
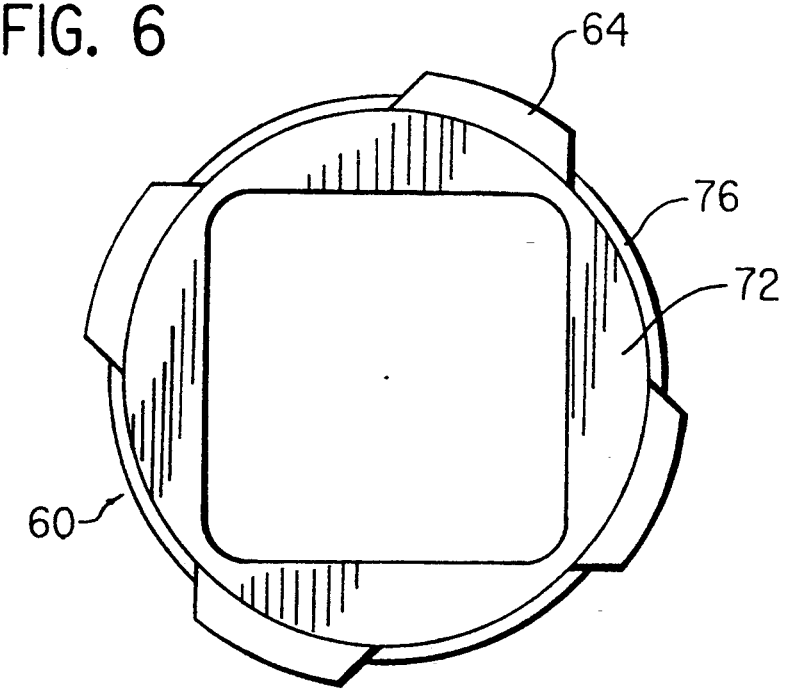
FIG. 6 is a front view of a berthing mechanism having a conventional configuration.
Figure 7:
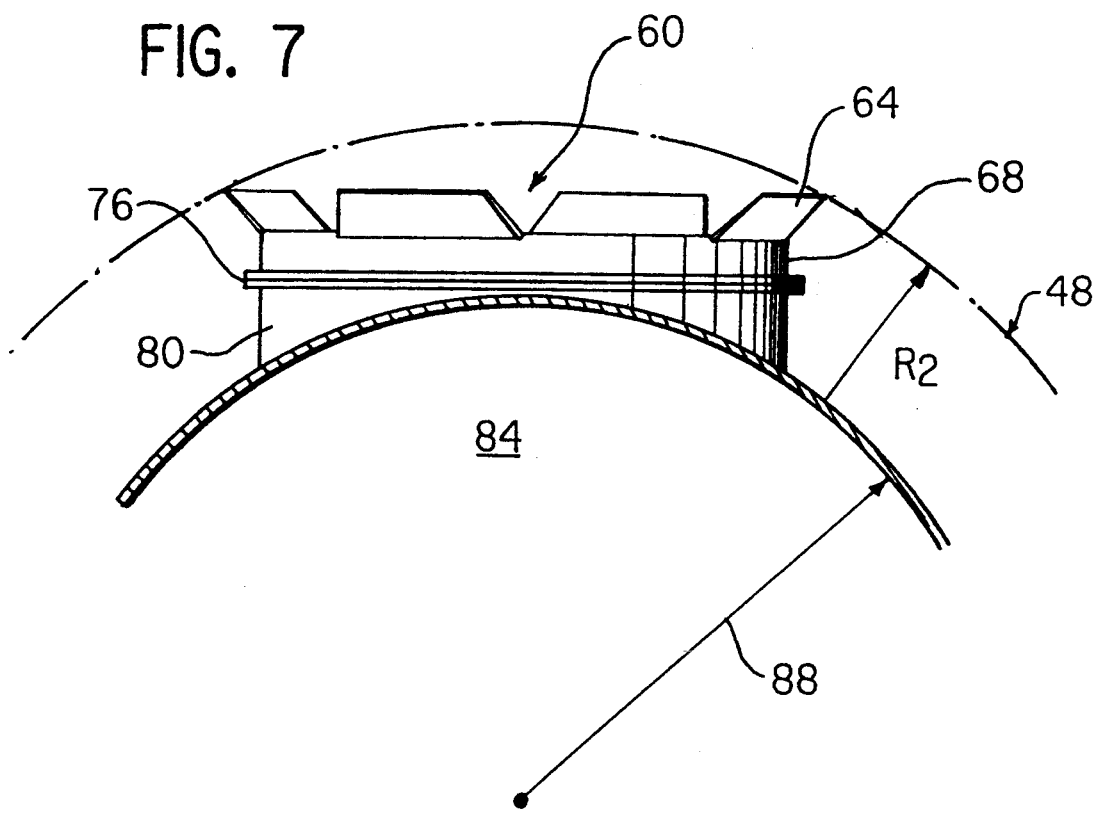
FIG. 7 is a top view of the berthing mechanism of FIG. 6.

For comparison, FIGS. 6 and 7 illustrate a conventionally configured berthing mechanism 60 that has a hatchway 62 sized to allow passage of a double rack (the same size opening as the opening 24 of the berthing mechanism 10 of FIGS. 1-5). In accordance with conventional geometry, the berthing mechanism 60 has alignment guides 64 positioned about the radius of a circular flange member 68. The flange 68 includes a forward interface surface 72 and a rear rim 76 for attaching the berthing mechanism 60 to a hatch 80 of a spacecraft pressure hull 84. With reference to FIG. 7, the amount of the radial projection $R_2$ of the berthing mechanism 60 is significantly greater than the radial projection $R_1$ of the berthing mechanism 10 shown in FIG. 3. Consequently, for the spacecraft pressure hull 84 to fit within the inside circumference of the transport vehicle payload bay, the maximum allowable radius 88 of the spacecraft pressure hull 84 must be significantly reduced.

It can be appreciated from the foregoing that the construction of the berthing mechanism 10 of the present invention imposes a minimal effect on the overall size of the spacecraft to which it is attached. Although the invention has been described with reference to a specific embodiment, it should be understood that the invention is not limited to the details thereof and is capable of further modifications. The appended claims are intended to cover any variations, uses or adaptation of the invention following, in general, the principles of the invention, and including such departures from the present disclosure as fall within known and customary practice within the art to which the invention pertains.

What is claimed is:

1. A spacecraft berthing mechanism for coupling spacecraft, comprising:
   a flange member defining a hatchway and being attachable to a spacecraft port, said flange member having a forwardly facing interface surface through which said hatchway passes and an outer peripheral surface extending rearwardly from said interface surface; and
   at least one alignment guide projecting from said flange member in a region of said flange member where said interface surface intersects said peripheral surface;
   wherein said peripheral surface has at least one beveled portion that is at an oblique angle with respect to said interface surface, said at least one beveled portion being positioned adjacent said at least one alignment guide.

2. The spacecraft berthing mechanism of claim 1, wherein said peripheral surface has a plurality of beveled portions.

3. The spacecraft berthing mechanism of claim 2, wherein said peripheral surface has four beveled portions spaced substantially evenly about said peripheral surface.

4. The spacecraft berthing mechanism of claim 3, wherein at least two alignment guides are arranged on said housing such that at least one of said alignment guides is positioned adjacent one of said beveled portions and at least one alignment guide is positioned adjacent a substantially opposing beveled portion.

5. The spacecraft berthing mechanism of claim 1, wherein said at least one alignment guide projects from said housing at an angle with respect to said interface surface that is substantially equal to said angle of said beveled portion.

6. The spacecraft berthing mechanism of claim 1, wherein said at least one beveled portion angles from said interface surface in a direction radially outwardly from said hatchway.

7. The spacecraft berthing mechanism of claim 1, wherein said outer peripheral surface is substantially cylindrical in shape with the exception of said at least one beveled portion which is substantially flat.

8. The spacecraft berthing mechanism of claim 1, wherein said interface surface is substantially flat.

9. The spacecraft berthing mechanism of claim 1, wherein said at least one alignment guide projects from said housing at an angle of approximately forty-five degrees (45°) with respect to said interface surface.

10. A spacecraft berthing mechanism for coupling spacecraft, comprising:
    a flange member defining a hatchway and being attachable to a spacecraft port, said flange member having a forwardly facing interface surface through which said hatchway passes and an outer peripheral surface extending rearwardly from said interface surface, said peripheral surface having a plurality of beveled portions each of which is adjacent to and at an oblique angle with said interface surface; and
    a plurality of alignment guides projecting from said flange member, each of said alignment guides being positioned adjacent to one of said beveled portions.

11. The spacecraft berthing mechanism of claim 10, wherein said alignment guides are mounted to said flange member in regions of said flange member where said interface surface and said peripheral surface intersect.

12. In combination with a spacecraft having a port and with a spacecraft transport vehicle having a payload bay for carrying the spacecraft, said payload bay having an inside circumference, a spacecraft berthing mechanism comprising:
    a flange member defining a hatchway and being attachable to a spacecraft port, said flange member having a forwardly facing interface surface through which a hatchway passes and an outer peripheral surface extending rearwardly from said interface surface; and
    at least one alignment guide member projecting from said flange member in a region of said flange member where said interface surface intersects said peripheral surface;
    wherein said at least one alignment guide member projects from said flange member at such an angle and distance that the guide member lies within a circular arc defined substantially by the outer radial limits of said flange member and the inside circumference of the payload bay of the transport vehicle.

13. The combination of claim 12, wherein said peripheral surface has at least one beveled portion that is at an oblique angle with respect to said interface surface, said at least one beveled portion being positioned adjacent said at least one alignment guide.

14. The combination of claim 12, wherein a plurality of alignment guide members project from said flange member.

* * * * *